Nov. 23, 1965  T. WATT  3,219,175

CONVEYOR BELT IDLER ROLLER UNIT

Filed April 17, 1963  2 Sheets-Sheet 1

INVENTOR
Thomas Watt
BY
Pennie, Edmonds, Morton, Taylor & Adams
ATTORNEYS

Nov. 23, 1965 T. WATT 3,219,175
CONVEYOR BELT IDLER ROLLER UNIT
Filed April 17, 1963 2 Sheets-Sheet 2

INVENTOR
Thomas Watt
BY
Pennie, Edmonds, Morton, Taylor & Adams
ATTORNEYS

United States Patent Office 3,219,175
Patented Nov. 23, 1965

3,219,175
CONVEYOR BELT IDLER ROLLER UNIT
Thomas Watt, 70 10th Ave., Johannesburg, Transvaal,
Republic of South Africa
Filed Apr. 17, 1963, Ser. No. 273,742
Claims priority, application Republic of South Africa,
Apr. 18, 1962, 1,644/62
19 Claims. (Cl. 198—192)

This invention relates to self-troughing idlers for conveyor belts.

According to the invention there is provided roller means mounted to rotate upon an articulated axle structure comprising a plurality of axles arranged end to end in series, a sleeve around each pair of adjacent ends of the axles, a resilient bush around each axle end and seating within the sleeve, sleeve limiting means limiting the outermost position of the bushes in the sleeve, axle limiting means limiting the outermost position of the bushes on the ends of their respective axles, and axle locating means to locate the disposition of the axles relative to each other about their axes and comprising axially projecting tongue elements connected with the ends of adjacent axles; whereby the axle ends are urged toward an initial position by the resilient bushes by coacting with the sleeve, and whereby adjacent axles are located arcuately in position relative to each other by the axially projecting tongue or elements.

The roller means may comprise a single continuous sheath of resilient material such as rubber suitably mounted on the axles, by bearing means or the sheath may be built up from a plurality of sheath parts secured together end to end. Alternatively, the roller means may comprise separate rollers independently supported, each on an axle for rotation thereon.

If desired, the sleeve may be of angle or elbow form, the angle defined between the limbs of the elbow being relatively large for troughing idlers but being largely a matter of individual choice depending upon circumstances.

The sleeve limiting means for an axle may comprise a locating sleeve washer seating within the sleeve and retained in position by a sleeve circlip seating within an annular groove provided within an end of the sleeve. For both axles, two circlips will be provided, one at each end of the sleeve.

The resilient bushes may be of rubber and are preferably retained under axial compression between the locating sleeve washer and the washer member of the axle limiting means. In other words the bushes are precompressed and to such an extent that even under maximum permissible deflection of the assembly, the outer fibers of the bushes do not become completely relaxed. The bushes, therefore, are always under some degree of compression within the sleeves.

The degree of deflection or misalignment of an axle relative to a sleeve may be limited by providing a predetermined amount of clearance between the axle and the bore of the locating sleeve washer, or between the outer surface of the locating axle washer and the bore of the sleeve, or by providing both.

The ends of adjacent axles may be rounded and may abut end-on.

In use, the end axles will be firmly supported in a conveyor idler chair support, pedestals, or the like, and prevented from rotation. The interengaging tongues of adjacent axles will ensure that the axles retain their torsional positions relative to each other, so that they do not get torsionally out of step, and so that the axes of the several axles will remain within a single plane during flexing. Flexing under load will cause deformation of the resilient bushes which will urge the axles towards an initial position in which the strain on the bushes is a minimum.

By way of further development the tongue element axle locating means may project coaxially with the axis of an axle and may be receivable within a mating slot provided in the adjacent end of an adjacent axle.

Alternatively, opposed axially projecting slots may be provided in the adjacent ends of two adjacent axles, there being provided a flat keying element engaging with a pair of opposed slots. The keying element may have a width somewhat less than the inner diameter of the axle circlips, or it may have a shoulder at one end or a pair of shoulders slightly wider than the inner diameter whereby the shoulder(s) will clip into engagement with a circlip for retaining the keying element in position, the other end entering freely into a slot without engaging with the axle circlip.

If desired, a keying element may be rigid and then it must be disposed in an upwardly directed plane during operation to permit relative deflection between adjacent axles under load. But it may be resilient, for example it may be of flat spring steel and then it can also be made to exercise a restraining couple on the adjacent ends of adjacent axles against axial misalignment. In an embodiment using angle or elbow type sleeves, the resilient flat keying elements may be bent to have two limbs defining an angle between them corresponding to the angle of the elbow.

The two ends of the articulated axle structure are arranged to be adjustably supported in position by suitable supporting means such as pedestals, hangers or the equivalent, such that its position can be retarded or advanced in relation to the direction of belt travel for belt centering purposes. Such end supporting means is arranged to cause deviation of the articulated axle structure from the vertical i.e. deviation from the direction of the load applied to the belt.

To enable the invention to be more clearly understood and carried into practice reference is now made to the accompanying drawings in which.

Figure 1:
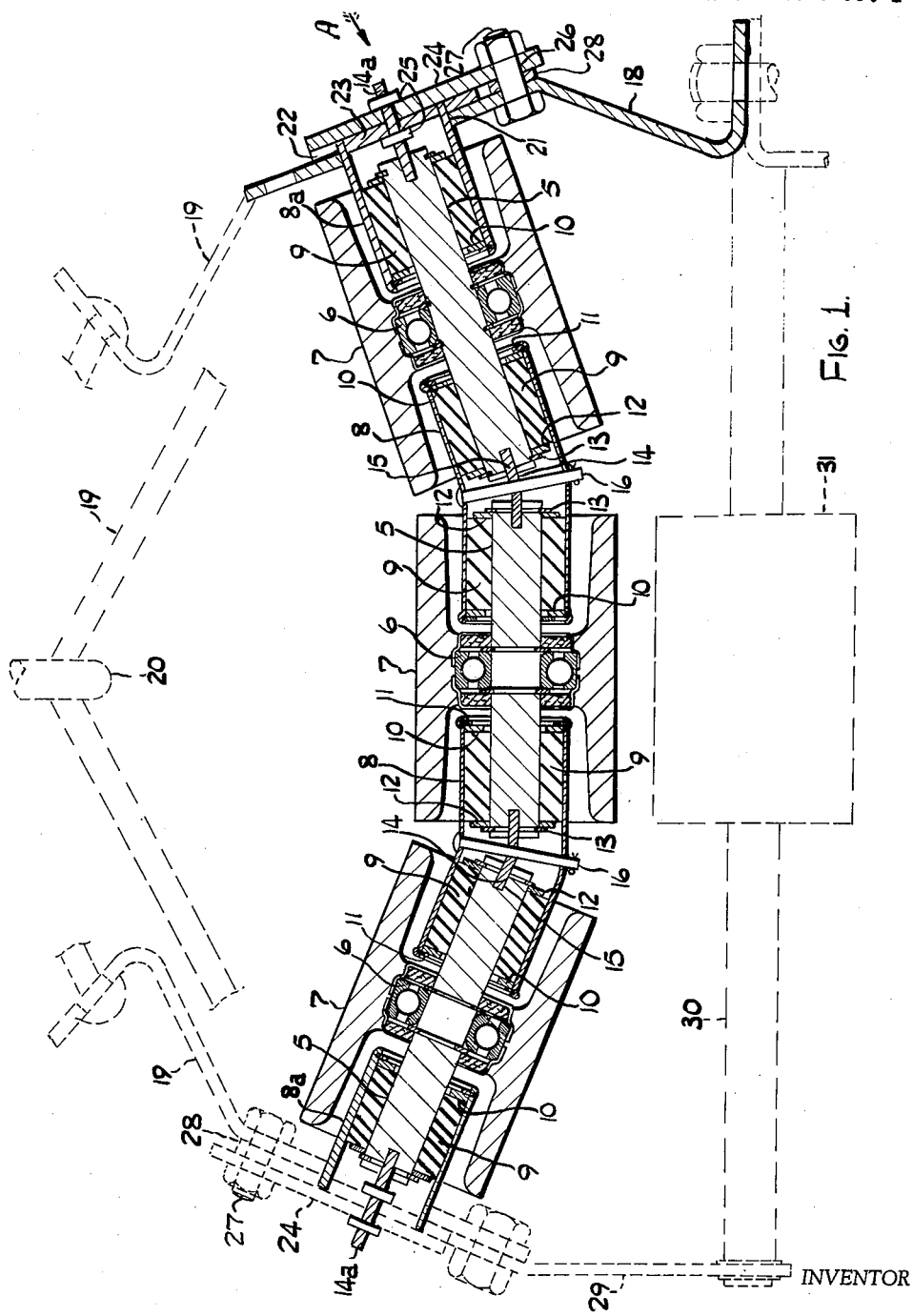
FIGURE 1 is a vertical part sectional view of a resilient troughing idler assembly constructed according to the invention.
Figure 3:
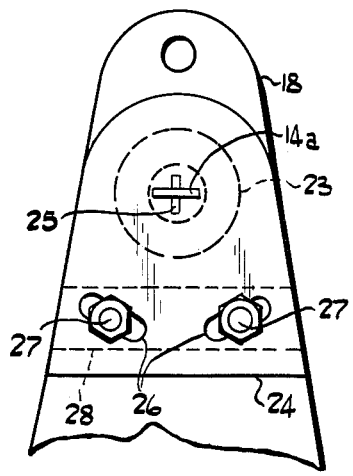
FIGURE 3 is a fragmentary end view taken in the direction of arrow A in FIGURE 1.
Figure 2:
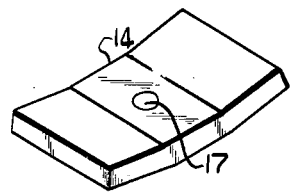
FIGURE 2 is a pictorial view of one of the axle locating tongue or key elements.

Referring to FIGURES 1, 2 and 3 of the drawings, reference 5 denotes the three axles, rotatably mounted on each of which by means of a ball-bearing 6, is a roller 7. An angle or elbow sleeve 8 surrounds each pair of adjacent ends of the axles 5 and a resilient rubber bush 9 is located between such axle ends and the sleeve 8. The outermost position of each bush 9 is limited by a locating sleeve washer 10 seating within the sleeve 8 which is retained in position by a sleeve circlip 11 seating within an annular groove provided within the sleeve end. The outermost position of a bush 9 with respect to the end of an axle 5 is limited by a washer 12 fitting over the axle end and a circlip 13 seating in an annular groove provided on the axle end.

The clearance space shown between the outer edge of a washer 12 and the bore of a sleeve 8 and a similar clearance space shown between the bore of the washer 10 and an axle 5, act to define the maximum degree of permissible deflection of the articulated axle structure as a whole.

The axle aligning or locating means comprise flat keying elements 14, as more clearly shown in FIGURE 2, the ends of which fit into transverse slots 15 provided in the adjacent ends of two axles 5. These keying elements 14 are preferably made from spring steel and are prevented from being dislodged by a pin 16 passing through apertures in a sleeve 8 and through an aperture 17 in a keying element 14.

The two ends of the idler assembly are arranged to be suitably supported such as by pedestals 18 as shown on the right hand side of FIGURE 1. Alternatively, the idler assembly may be arranged to be suspended such as from the hanging wall of an underground passage or the like by a yoke 19, shown in broken outline and secured to a fixture 20 such as an anchor bolt.

The top end of the pedestal 18 is provided with an aperture 21 to receive the outer end of a straight end sleeve 8a which has a stop flange ring 22 fixed to it such as by welding. A locating disc 23 is slidably inserted in the end of the sleeve 8a. Located on the outside of the flange ring 22 is an adjusting plate member 24 which, together with the disc 23, is slotted to receive one end of a flat keying element 14a, the opposite end of which engages in the slot 15 of the axle 5. Cotter pins 25 secure the keying element 14a in position. The lower end of the adjusting plate member 24 is provided with two spaced arcuate slots 26 through each of which passes a fixing bolt 27. The bolts 27 are located in corresponding holes in the pedestal 18. A similarly slotted spacing strip 28 is fixed to the inside of the plate member 24 such as by welding. To effect radial adjustment of the end of the axle 5, the plate member, 24 after loosening of the bolts 27, can be swung in either direction about the axis of the axle 5 and thereafter clamped in position by tightening the bolts 27.

When the troughing roller assembly is to be suspended, such as by the yoke 19, the side members thereof are extended downwardly and suspension elements 29 bolted to the lower ends thereof, are arranged to support a shaft 30 on which one or more rollers 31 are mounted to support the slack or return run of the conveyor belt (not shown). This arrangement is shown in broken outline on the left of FIGURE 1.

In this case, the apertures to receive the end of the sleeve 8a are provided in the yoke members 19 and the adjusting plate members 24 are inverted with the clamping bolts 27 passing through arcuate slots in what will then be the upper end thereof.

Figure 4:
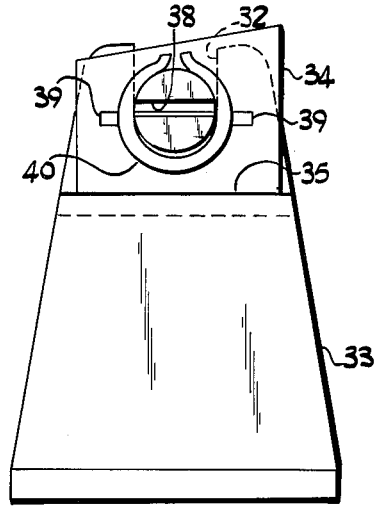
FIGURE 4 is an end view showing alternative means for supporting the ends of the articulated axle structure.
Figure 5:
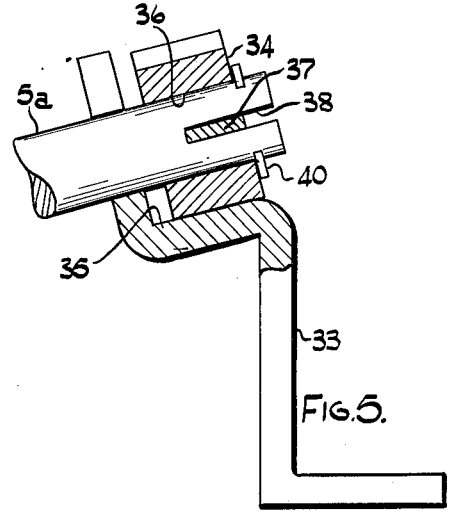
FIGURE 5 is a part-sectional end view taken on FIGURE 4.

Reference is now made to FIGURES 4 and 5 illustrating alternative means for supporting the ends of the articulated axle structure. In this case the outer end of an end axle 5a which projects beyond the outer end of the outer roller or its equivalent, is arranged to be supported in the slot 32 in the top end of a pedestal 33 by means of a bearing pad 34 which is arranged to seat on the supporting surface 35 of the pedestal 33, and has a bore 36 by means of which it is a sliding fit on the end of the axle 5a. A flat key element 37 engaging in a transverse slot 38 in the end of the axle 5a and having its ends engaging in slotted radial extensions 39 of the bore 36 of the bearing pad 34, locks the bearing pad to the axle 5a. A circlip 40 locates the bearing pad 34 and the key element 37 on the axle 5a.

As shown, the bottom side of the bearing pad 34 is parallel with the slot 38 while the top side 41 slopes at an acute angle thereto.

With the bearing pad in the position shown in FIGURES 4 and 5, the axle 5a is in its normal position. By removing the bearing pad 34, rotating it through 180 degrees and refitting it in position on the axle 5a, the sloping side 41 will coact with the supporting surface 35 and thereby the axle 5a will be deflected radially in one direction.

By removing the bearing pad 34 again and reversing it endwise, the axle 5a will be radially deflected in the opposite direction about its axis.

I claim:
1. A conveyor belt resilient troughing idler assembly which includes, roller means mounted to rotate upon an articulated axle structure comprising a plurality of axles arranged in angularly disposed endwise relationship with the end portions of adjacent axle ends located out of axial alignment with respect to one another, a sleeve of angle form around each pair of adjacent ends of the axles, a resilient bush around each axle end and seating within the sleeve, sleeve limiting means limiting the outermost position of the bushes in the sleeve, axle limiting means limiting the outermost position of the bushes on the ends of their respective axles, and axle locating means to locate the disposition of the axles relative to each other about their axes and comprising axially projecting tongue elements connected with the ends of adjacent axles, whereby the axle ends are urged towards an initial position by the resilient bushes by coacting with the sleeve, and whereby adjacent axles are located arcuately in position relative to each other by the axially projecting tongue elements.

2. A conveyor belt resilient troughing idler assembly as claimed in claim 1, wherein the roller means comprises separate rollers independently supported, each on an axle, for rotation thereon.

3. A conveyor belt resilient troughing idler assembly as claimed in claim 1, wherein the sleeve limiting means for an axle comprises a locating sleeve washer seating within the sleeve and retained in position by a sleeve circlip seating within an annular groove provided within an end of the sleeve, and wherein the axle limiting means limiting the outermost position of a resilient bush with respect to the end of an axle comprises a washer fitting over the axle end and a circlip seating in an annular groove provided on the axle end.

4. A conveyor belt resilient troughing idler assembly as claimed in claim 3, wherein the resilient bushes are of rubber and are retained under axial compression between the sleeve limiting means and the axle limiting means.

5. A conveyor belt resilient troughing idler assembly as claimed in claim 4, wherein the resilient bushes are pre-compressed to such an extent that even under maximum permissible deflection of the assembly, the outer fibres of the bushes do not become completely relaxed.

6. A conveyor belt resilient troughing idler assembly as claimed in claim 4, wherein the degree of deflection or misalignment of an axle relative to a sleeve is limited by providing a predetermined amount of clearance between the axle and the bore of the sleeve locating washer.

7. A conveyor belt resilient troughing idler assembly as claimed in claim 5, wherein the degree of deflection or misalignment of an axle relative to a sleeve is limited by providing a predetermined amount of clearance between the outer surface of the locating axle washer and the bore of the sleeve.

8. A conveyor belt resilient troughing idler assembly as claimed in claim 1, wherein the tongue element axle locating means projects coaxially with the axis of an axle and is receivable within a mating slot provided in the adjacent end of an adjacent axle.

9. A conveyor belt resilient troughing idler assembly as claimed in claim 1, wherein opposed axially projecting transverse slots are provided in the adjacent ends of two axles and the tongue element axle locating means comprises a flat keying element having its ends engaging with such slots.

10. A conveyor belt resilient troughing idler assembly as claimed in claim 9, wherein the keying element is resilient such as by being made from a strip of flat spring steel.

11. A conveyor belt resilient troughing idler assembly as claimed in claim 9, wherein the keying element, when used with a sleeve of angle form is bent to have two limbs defining an angle between them corresponding to the angle of the sleeve.

12. A conveyor belt resilient troughing idler assembly as claimed in claim 1, wherein the two ends of the articulated axle structure are adjustably supported in position by an adjustable supporting means which includes means for adjusting it in such a manner that the position of the axle structure can be retarded or advanced in relation to the direction of belt travel for belt centering purposes.

13. A conveyor belt resilient troughing idler assembly as claimed in claim 12, wherein the end supporting means for the articulated axle structure is arranged to cause deviation thereof from the vertical, that is deviation from the direction of the load applied to the belt.

14. A conveyor belt resilient troughing idler assembly as claimed in claim 1, including an end supporting means for the axle structure comprising a fixed supporting member and an adjustable member coacting therewith, each member having a bore to receive the end of an axle, the fixed member having a supporting surface below the bore therein, the adjustable member being non-rotatably connectable to the axle end and having a plurality of faces thereon for coacting with said support surface, at least one of which faces is sloping, whereby its orientation on the axle end will enable such axle to be supported on the fixed member in various radial positions.

15. A conveyor belt resilient troughing idler assembly as claimed in claim 14, wherein the fixed supporting member is a pedestal, and wherein the adjustable member is a bearing pad which is connectible to the axle end by means of a flat keying element engaging in a transverse slot in the axle end and in a corresponding slot opening forming an extension of the bore of the bearing pad, the keying element and the bearing pad being secured in position by a circlip.

16. A conveyor belt resilient troughing idler assembly as claimed in claim 13, wherein an end member of the articulated axle structure is rotatably located in a bore in a fixed member, wherein an adjustable member coacting with the fixed member is non-rotatably connected to the outer end of an end axle, and wherein such adjustable member is adjustably securable to the fixed member in different angular positions with respect to the axis of the axle so as to vary the radial position of such axle with respect to the fixed member.

17. A conveyor belt resilient troughing idler assembly as claimed in claim 16, wherein the fixed member is a supporting element and the adjustable member is a plate provided with an arcuate slot, and a fixing bolt anchored to the supporting element and projecting through said arcuate slot, whereby such plate is capable of being clamped to the supporting element in various angular positions with respect to the axis of the axle.

18. A conveyor belt resilient troughing idler assembly as claimed in claim 17, wherein the end member of the articulated axle structure which is rotatably located in the bore of the supporting element, is the end of a straight sleeve, and wherein the adjustable plate is connected to the outer end of the axle in a non-rotatable manner by means of a flat key element having one end passing through a slotted aperture therein and the opposite end engaging in a transverse slot in the end of the axle.

19. A resilient troughing idler assembly for conveyor belts, including an articulated axle structure having roller means mounted thereon for rotation, said axle structure comprising a plurality of axles arranged in angularly disposed endwise relationship with the end portions of adjacent axle ends located out of axial alignment with respect to one another, a sleeve of angle form surrounding the end portions of adjacent axle ends of the axle structure, a resilient bush around each of said axle end portions and seating within the sleeve therearound, sleeve limiting means limiting the outermost position of the bushes in the sleeve, axle limiting means limiting the outermost position of the bushes on the end portions of the respective axles, a roller and a bearing unit therefor mounted on each axle, and means for supporting the outer ends of the outer of said plurality of axles.

References Cited by the Examiner
UNITED STATES PATENTS

| | | | |
|---|---|---|---|
| 1,577,725 | 3/1926 | Jones | 198—192 |
| 1,838,190 | 12/1931 | Robbins | 198—192 |
| 2,084,761 | 6/1937 | Bradley | 285—235 X |
| 2,316,509 | 4/1943 | Fawick | 64—11 |
| 2,632,560 | 3/1953 | Wright | 198—192 |
| 2,854,131 | 9/1958 | Murray | 198—192 X |
| 2,966,255 | 12/1960 | Gleeson. | |
| 3,062,361 | 11/1962 | Arndt | 198—192 |
| 3,075,632 | 1/1963 | Watt | 198—192 |

SAMUEL F. COLEMAN, *Primary Examiner.*

ERNEST A. FALLER, *Examiner.*